SIGNAL PROCESSING APPARATUS

Filed Dec. 31, 1957 5 Sheets-Sheet 1

INVENTOR.
DANIEL J. SIKORRA
BY George W. Field
ATTORNEY

June 26, 1962 D. J. SIKORRA 3,041,479

SIGNAL PROCESSING APPARATUS

Filed Dec. 31, 1957 5 Sheets-Sheet 2

INVENTOR.
DANIEL J. SIKORRA

BY George W. Field

ATTORNEY

SIGNAL PROCESSING APPARATUS

Filed Dec. 31, 1957 5 Sheets-Sheet 3

INVENTOR.
DANIEL J. SIKORRA
BY George ... [signature]
ATTORNEY

June 26, 1962 D. J. SIKORRA 3,041,479

SIGNAL PROCESSING APPARATUS

Filed Dec. 31, 1957 5 Sheets-Sheet 4

INVENTOR.
DANIEL J. SIKORRA

BY

[signature]
ATTORNEY

SIGNAL PROCESSING APPARATUS

Filed Dec. 31, 1957 5 Sheets-Sheet 5

INVENTOR.
DANIEL J. SIKORRA

BY George Field
ATTORNEY

United States Patent Office 3,041,479
Patented June 26, 1962

3,041,479
SIGNAL PROCESSING APPARATUS
Daniel J. Sikorra, Champlin, Minn., assignor to Minneapolis-Honeywell Regulator Company, Minneapolis, Minn., a corporation of Delaware
Filed Dec. 31, 1957, Ser. No. 706,318
5 Claims. (Cl. 307—106)

This invention relates to signal processing apparatus and more particularly relates to circuits employing switch-capacitive signal translation circuits.

Shown in this specification are a quadrature rejector, a high-pass filter, a demodulator, and an alternating signal integrator, each of which embodies the invention. The quadrature rejector and the demodulator operate by virtue of switching capacitors back and forth between input and output circuits, the switching having a certain synchronized relationship to the alternating input signal. The high-pass filter circuit is quite similar to the quadrature rejector circuit, but incorporates additional capacitors which cooperate with the remainder of the circuit in a manner particularly suitable for the desired high-pass feature. The integrator operates, briefly, by connecting a first capacitor to an input circuit to integrate the positive half cycles of input signal and connecting the second capacitor to the input to integrate with respect to time the negative half cycles, each capacitor being connected during the intervening periods to present its accumulated signal to an amplifier. The connecting or switching of the capacitors in the circuits is performed by a diode switch arrangement.

Circuits wherein capacitors are switched alternately in and out of certain branches are well known. Several examples can be found in "Design of A.C. Filter Networks Using Choppers," by Gardner Sloan, published in July 1955 by the Instrumentation Laboratory of Massachusetts Insitute of Technology. This publication shows several arrangements using capacitors or inductors with mechanical choppers that may serve as "lead" or "lag" networks in A.C. applications. The present invention relates to circuits that resemble these examples, but in which different techniques are employed to accomplish the particular results desired and in which the need for mechanical choppers has been eliminated.

Figure 1:
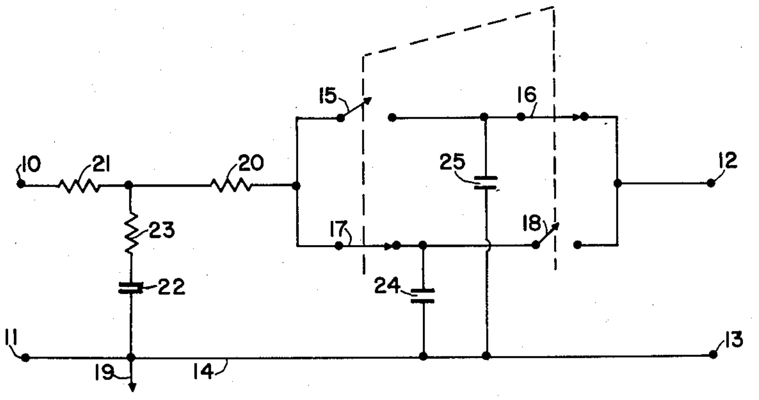
FIGURE 1 is a simplified schematic circuit of a quadrature rejector embodying the invention.

This invention will be understood upon consideration of the accompanying specification, claims, and drawings, of which:

*Structure of FIGURE 1*

The quadrature rejector circuit of FIGURE 1 has input signal terminals 10 and 11 and output signal terminals 12 and 13. Terminals 11 and 13 are interconnected by a conductor 14, which is connected to common point 19.

Four switches 15, 16, 17, and 18 are arranged to operate so that when switches 15 and 18 are open switches 16 and 17 are closed, and vice versa. Switches 15 and 16 are connected in series, the series combination being connected from terminal 12 to one end of a resistor 20. Switches 17 and 18 are also connected in series, this series combination also being connected between terminal 12 and the same end of resistor 20. A resistor 21 connects terminal 10 to the other end of resistor 20, and the junction of resistors 20 and 21 is connected to common point 19 through the series combination of a capacitor 22 and a resistor 23. Resistors 21 and 23 and capacitor 22 act as a phase shifting input network that cooperates with the switching circuitry. A capacitor 24 is connected from common point 19 to the junction of switches 17 and 18. Another capacitor 25 is connected from common point 19 to the junction of switches 15 and 16.

*Operation of FIGURE 1*

To understand the operation of the circuit in FIGURE 1 as a quadrature rejector, one of the first considerations is the manner in which switches 15, 16, 17 and 18 operate. As shown, switches 16 and 17 are closed and switches 15 and 18 are open. With the switches in this condition, capacitor 24 is connected across the input circuit comprising resistors 20, 21, and 23 and capacitor 22; and capacitor 25 is connected across output terminals 12 and 13. When the condition of the switches is reversed, so that switches 15 and 18 are closed and switches 16 and 17 are open, the capacitor connections are also reversed, so that capacitor 25 is connected across the input circuit, and capacitor 24 is connected across output terminals 12 and 13. The method by which this switching is actually accomplished will be explained later; it is sufficient for the present to understand that during a first half cycle of a reference voltage one of capacitors 24 and 25 is connected across the input circuit and the other is connected across the output and that these connections are interchanged every half cycle. Consequently the means for actuating the switches cause the switches to be in one condition during negative half cycles of the reference voltage and to be in the other condition during the positive half cycles of the reference voltage. This switching operation is dependent only upon the reference voltage and not upon the input signal applied at terminals 10 and 11.

It is also important to understand that the values of resistors 20, 21, and 23 and capacitor 22 operate in conjunction with whichever of capacitors 24 and 25 is connected to resistor 20 to cause a phase lag of 90° across capacitor 24 or 25 from the phase of the input signal across terminals 10 and 11. For example assume that an input signal, of the same frequency as the above mentioned reference voltage that actuates the switches, is applied across terminals 10 and 11. Then when capacitor 24 is connected to resistor 20, in other words is connected across the input circuit, the voltage across capacitor 24 lags the input signal by 90°. Likewise, when capacitor 25 is connected across the input circuit its voltage lags the input signal by 90°.

With the above points understood, the step-by-step explanation in the following examples will result in a clear understanding of the quadrature rejecting features of this circuit.

Assume that the circuit of FIGURE 1 is in normal operation, switches 15, 16, 17 and 18 being operated as described above in synchronism with a reference voltage. Further, let an input signal connected to terminals 10 and 11 be of the same frequency, and in phase with, the reference voltage and be of steady R.M.S. amplitude. Also let the condition of the switches as shown in FIGURE 1 be the condition at the beginning of a positive half cycle of the reference voltage. Switches 16 and 17 then are closed during the positive half cycles and are opened during the negative half cycles of the reference voltage. This being so, the voltage across capacitor 24 follows the input signal, but with a phase lag of 90°; when switch 17 opens at the end of the reference positive half cycle the voltage on capacitor 24 is therefore at a positive maximum corresponding to the positive maximum of the in-phase input signal. As switch 17 is opened switch 18 is closed, so that the voltage of capacitor 24 is then connected across output terminals 12 and 13. At the same time, of course, switch 16 is opened and switch 15 is closed, thereby connecting capacitor 25 to the input circuit as capacitor 24 was just previously connected. During the subsequent reference negative half cycle, capacitor 25 is charged to a maximum negative voltage corresponding with the maximum negative voltage of the in phase input signal, and at the end of this negative half cycle the condition of the switches is reversed so that capacitor 25 is connected across output terminals 12 and 13 and so that capacitor 24 is again connected to the input circuit. It is seen that as the switching continues the voltage appearing across output terminals 12 and 13 is a full-wave square-shaped signal dependent in magnitude upon the magnitude of the in-phase signal input applied to terminals 10 and 11.

Assume now, as a further example, that the input signal applied to terminals 10 and 11 is ninety degrees out of phase with the reference voltage that actuates the switches. Since this input signal is lagged ninety degrees at capacitors 24 and 25, it is evident that the voltages presented by capacitors 24 and 25 to output terminals 12 and 13 are zero. In more detail, when switch 17 opens at the end of a positive half cycle of the reference voltage, the input signal voltage is at a maximum; since the voltage across capacitor 24 lags the input by 90°, however, this voltage on capacitor 24 will at that instant be zero. The subsequent closing of switch 18 therefore causes a zero voltage to be connected across output terminals 12 and 13. This same action takes place with regard to capacitor 25, but occurs one-half cycle later. It is clear, therefore, that an input signal which is ninety degrees out of phase with the reference signal is not allowed to pass from input to output of the circuit in FIGURE 1. Such a signal, hereinafter referred to as a quadrature signal, is effectively rejected so far as output terminals 12 and 13 are concerned.

The above two examples pointed out the operation of the circuit on an in-phase signal and on a quadrature signal. Since a signal having both in-phase and quadrature components may be analyzed and treated as merely the summation of its components, consideration of the superposition theorem makes it evident that the output of the quadrature rejector circuit consists of the summation that would result were the in-phase and quadrature components operated on individually and added together thereafter. Since the circuit rejects the quadrature signals, it is clear that the output of terminals 12 and 13 is a signal proportional in magnitude only to the in-phase component of an input signal, the quadrature component, if any, being effectively eliminated or rejected.

Figure 8:
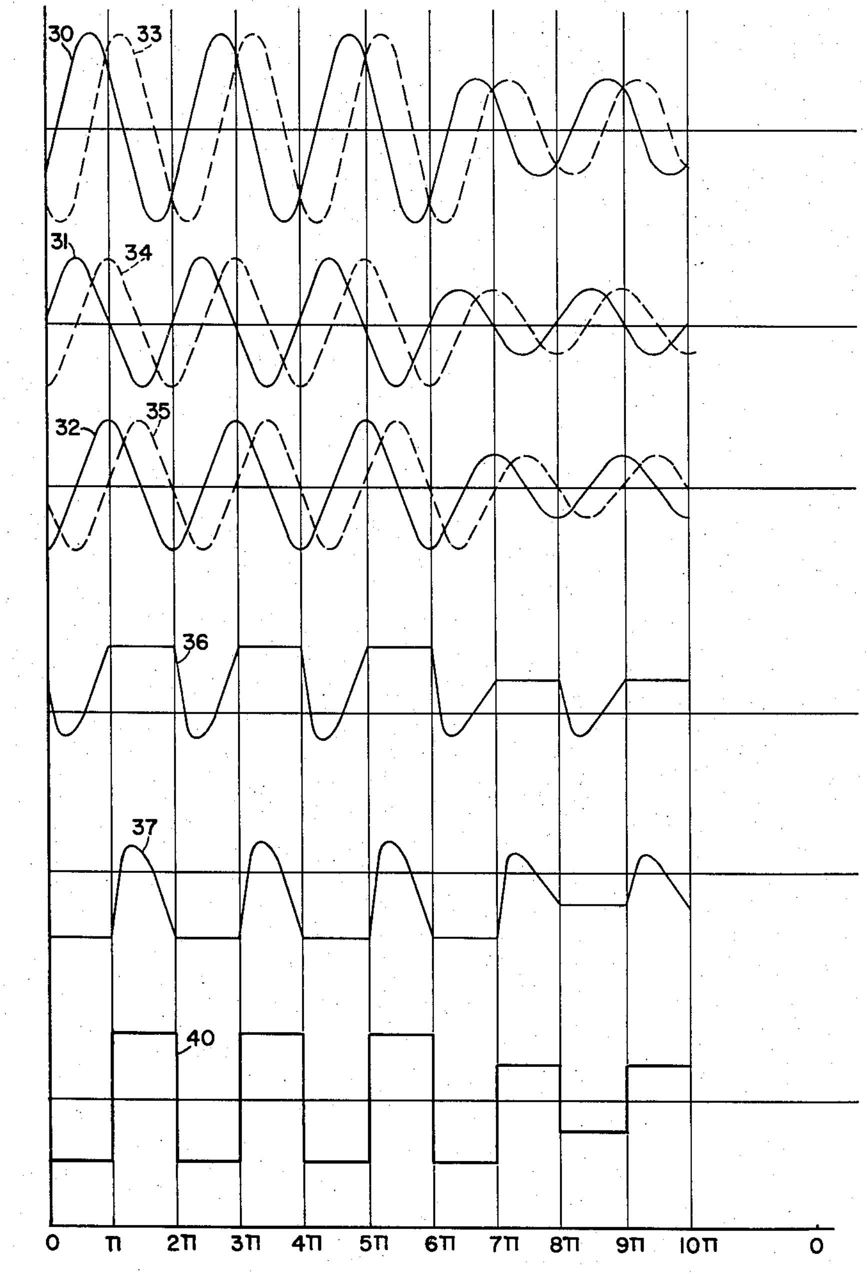
FIGURE 8 is a pictorial representation of wave forms appearing in the quadrature rejector circuit.

Consideration of the curves shown in FIGURE 8 leads to an even clearer understanding of the operation of the quadrature rejector of FIGURE 1. In FIGURE 8 a curve 30 represents a varying magnitude input signal which has both an in-phase component, represented by curve 31, and a quadrature component, represented by curve 32. Curve 33 represents input signal 30 lagged by ninety degrees. Likewise, curve 34 represents the in-phase component 31 lagged by ninety degrees, and curve 35 represents the quadrature component 32 lagged by ninety degrees. Curves 36 and 37 depict, respectively, the voltage across capacitors 24 and 25. The output across terminals 12 and 13 in FIGURE 1 is represented by curve 40. The scale at the bottom of FIGURE 8 is in radians of reference signal, $2\pi$ radians representing a complete cycle.

With reference to the scale of FIGURE 8, switch 17 is closed from zero to $\pi$, from $2\pi$, to $3\pi$, from $4\pi$ to $5\pi$, and so forth. Looking at the interval from zero to $\pi$, it is evident that the voltage across capacitor 24, represented by curve 36, follows the input signal lagged by ninety degrees, curve 33, except for an initial transient occurring when switch 17 closes. When switch 17 opens at $\pi$ radians, capacitor 24 is charged to a voltage proportional to the maximum positive peak of the in-phase component of the input voltage, curve 30. This becomes clear when it is considered that curve 33, representing the lagged input signal, is the summation of in-phase component, curve 34, and quadrature component, curve 35. It is seen that curve 34 is at a maximum at $\pi$ radians and that curve 35 equals zero at $\pi$ radians. At $\pi$ radians, therefore, the voltage of capacitor 24 is representative only of the in-phase component of the signal, the quadrature component having no effect at this point. This is also true, of course, at the $3\pi$, $5\pi$, $7\pi$, and so forth. The operation is similar with reference to capacitor 25, except that switch 15 is closed between $\pi$, and $2\pi$ radians, $3\pi$ and $4\pi$ radians, and so forth, so that capacitor 25 is charged once each cycle to a voltage proportional to the negative peaks of the in-phase component of the input signal, whereas capacitor 24 is charged to the like positive peaks. The operation of the remainder of the circuit in FIGURE 1 becomes clear when it is recalled that switch 18 closes when switch 17 opens and switch 16 opens when switch 15 closes. Thus, when switch 17 opens at $\pi$ radians, switch 18 closes and connects capacitor 24 across output terminals 12 and 13 for the next half cycle, from $\pi$ to $2\pi$ radians. Likewise, at $2\pi$ radians switch 15 opens and switch 16 closes thereby connecting capacitor 25 to output terminals 12 and 13. As a result, the output signal 40 is an essentially square wave signal made up of the flat topped portions of capacitor 24 voltage, curve 36, and the flat bottomed portions of capacitor 25 voltage, curve 37. The curves in FIGURE 8, of course, represent ideal operation; a substantial load across output terminals 12 and 13 results in exponential slopes rather than the square positive and negative maxima shown on curve 40. There is also a small time delay between input and output, so that, with a step change in input signal it may take approximately one cycle for the output signal to reach its new steady-state value. It should be understood that the nature of the switching is such that in no case are switches 15 and 16 closed at the same instant, nor are switches 17 and 18 ever both closed at the same instant; further, switches 15 and 17 are never closed at the same instant, nor are switches 16 and 18. This manner of operation prevents capacitors 24 and 25 from being connected in parallel with each other, and also prevents output terminals 12 from ever being directly connected to the input circuitry; capacitors 24 and 25 are, in other words, switched in a mutually exclusive manner alternately across the input and output circuitry. The output circuit is thus completely isolated from the input circuit, the transfer in signal energy coming about only as a result of the "bucket brigade" arrangement employing capacitors 24 and 25.

An arrangement that accomplishes the desired switching as outlined above will be explained with reference to FIGURE 2.

Figure 2:
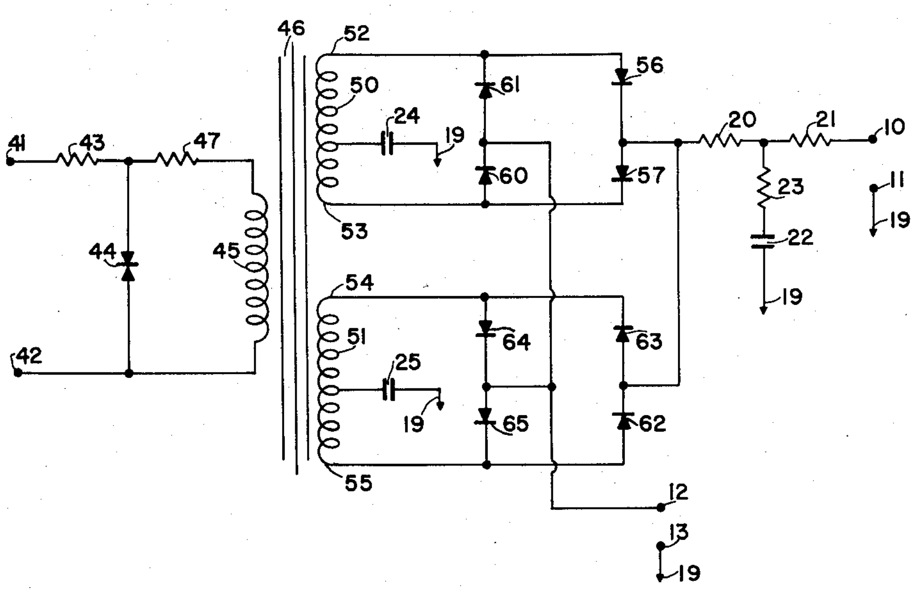
FIGURE 2 is a more detailed circuit of the apparatus in FIGURE 1.

*Structure of FIGURE 2*

Some of the components of FIGURE 2 are identical with those of FIGURE 1 and therefore are designated by the same numerals. The circuit of FIGURE 2 is essentially that of FIGURE 1 with diode switches incorporated to operate as switches 15, 16, 17 and 18. The diode switches in FIGURE 2 are operated by a reefrence voltage applied at a pair of terminals 41 and 42. A resistor 43 and back-to-back Zener diode device 44 are connected in series across terminals 41 and 42. When the alternating current reference voltage is of sufficient magnitude, this arrangement causes a substantially rectangular shape voltage to appear across the Zener device 44. A primary winding 45 of a transformer 46 is connected in series with a resistor 47, and this series combination is connected across Zener device 44. Resistor 47 acts as a current controlling means and causes the current wave shape of winding 45 to closely approximate the voltage wave shape of Zener device 44. Transformer 46 has two assentially identical center tapped secondary windings 50 and 51 poled in such a manner that one end 52 of winding 50 has the same polarity with respect to its other end 53 as does the end 54 of winding 51 with respect to its other end 55. Capacitor 24 is connected between the center tap of winding 50 and common point 19; likewise, capacitor 25 is connected between the center tap of winding 51 and common point 19. A series pair of diodes 56 and 57 are connected across winding 50 and are poled so that the direction of easy current flow is from winding end 52, through diode 56, through diode 57, and back to winding end 53. Another series pair of diodes 60 and 61 are connected across winding 50 so that direction of easy current flow is from winding end 53, through diode 60, through diode 61, and to winding end 52. In a similar manner, there are connected across winding 51 two more pairs of series diodes, diodes 62 and 63 and diodes 64 and 65. The path of easy current flow through diodes 64 and 65 is from winding end 54, through diode 64, through diode 65, and to winding end 55; diodes 62 and 63 are poled in the other direction so that easy current flow is from winding end 55, through diode 62, through diode 63, and to winding end 54. The junction between diodes 56 and 57 is connected directly to the junction between diodes 62 and 63 and is further directly connected to one end of resistor 20, the other end of which is connected through resistor 21 to input terminal 10. The junction of resistors 20 and 21 is connected through the series combination of resistor 23 and capacitor 22 to common point 19. The other signal input terminal, terminal 11, is connected to common point 19. The junction of diodes 60 and 61 is connected directly to the junction of diodes 64 and 65 and is also directly connected to output terminal 12. Output terminal 13 is connected to common point 19.

*Operation of FIGURE 2*

The operation of the circuit in FIGURE 2 is basically the same as that of the circuit in FIGURE 1, so that the only portion of the circuit in FIGURE 2 that requires further explanation at this point is the diode switches.

Diodes 56 and 57 replace switch 17, and diodes 60 and 61 replace switch 18. In the same manner, diodes 62 and 63 replace switch 15, and diodes 64 and 65 replace switch 16.

As is well known, the effective impedance, that is the incremental resistance, across a forward biased diode is very low, and conversely the impedance across a backward biased diode is very high. As a result, when winding end 52 is more positive than winding end 53 there is very low impedance from the junction of diodes 56 and 57 to the center tap of winding 50 and there is very high impedance from the junction of diodes 60 and 61 to the center tap of winding 50. In this case capacitor 24 is connected to resistor 20 just as it was when switch 17 was closed in FIGURE 1. On the other hand, when winding end 53 is more positive than winding end 52, the opposite condition prevails, and capacitor 24 is connected to output terminal 12, just as was the case when switch 18 was closed in FIGURE 1. Similarly, when winding end 54 is more positive than winding end 55, diodes 64 and 65 are forward biased and capacitor 25 is connected to output terminal 12. When winding end 55 is more positive than winding end 54, diodes 62 and 63 are forward biased, so that capacitor 25 is connected to resistor 20 of the input circuit. It is seen that when capacitor 24 is connected to the input circuit capacitor 25 is connected to the output circuit, and vice versa. This is the action desired, as explained with regard to FIGURE 1.

The primary circuit of transformer 46 is arranged to produce fast switching of the diode switches, and has other advantages. Since the current wave shape in primary winding 45 is a clipped sine wave, the time required to switch can be adjusted as desired by adjusting the magnitude of the reference voltage applied to terminals 41 and 42—resistor 43, of course, may have to be adjusted accordingly to avoid exceeding a maximum allowable current through back-to-back Zener diode device 44. Another advantage of the switching arrangement shown in FIGURE 2 is that there is a point every half cycle, where the reference voltage is passing through zero, where all of the diode switches are off, since the impedance of the diodes is high unless they are forward biased. This is important, for it fulfills the requirement explained in connection with FIGURE 1 that certain switches not be on simultaneously. Looking again at FIGURE 2, and recalling that as the reference voltage passes through zero potential all the diode switches are off, it becomes clear that the pair of switches that are on during one-half cycle are positively turned off before the other pair of switches is turned on during the following half cycle.

The operation of FIGURE 2 with respect to quadrature rejection and the translation from input to output of the in-phase component of the input signal is the same as that of FIGURE 1, the reference voltage applied to terminals 41 and 42 of FIGURE 2 being in phase with the in-phase component of the input signal applied to terminals 10 and 11.

In one successful embodiment of FIGURE 2 the following components were used:

| | |
|---|---|
| Resistors **20** and **21** | 10K ohms. |
| Resistor **23** | Selected for exact phase shift. |
| Capacitor **22** | .015 mfd. |
| Capacitors **24** and **25** | .1 mfd. |
| Resistor **43** | 10K ohms. |
| Resistor **47** | 5.6K ohms. |
| Diode device **44** | IN–475. |
| Transformer **46**: | |
| Primary turns | 1200. |
| Secondary turns (each) | 1200 center tapped. |
| Diodes **56**, **57**, **60**, **61**, **62**, **63**, **64**, and **65** | HD–6005. |

Figure 3:
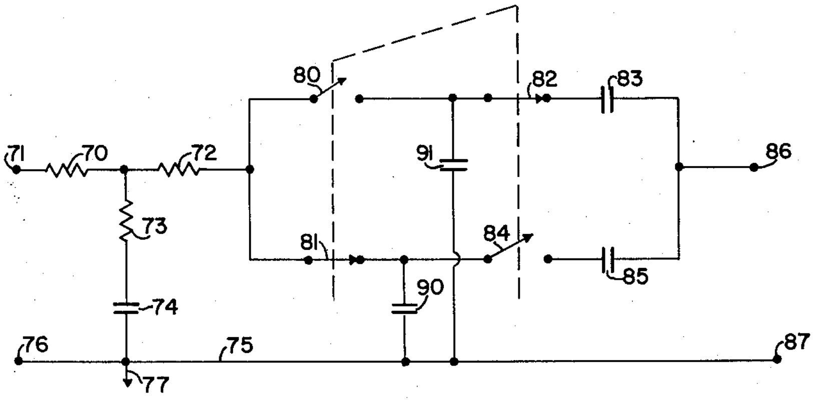
FIGURE 3 is a simplified schematic diagram of a high-pass filter.

*Structure of FIGURE 3*

FIGURE 3 shows a high-pass circuit. As will be noted by inspection, this circuit is almost identical with that of FIGURE 1. In FIGURE 3, a resistor 70 is connected from a signal input terminal 71 to one end of a resistor 72 and to one end of a resistor 73. The other end of resistor 73 is connected through a capacitor 74 to a conductor 75, which is connected to another signal input terminal 76 and to a common point 77. The other end of resistor 72 is connected to one side of a switch 80 and to one side of a switch 81. The other side of switch 80 is connected through a further switch 82 to a capacitor 83, and the other side of switch 81 is connected through a further switch 84 to one side of a further capacitor 85, the other sides of capacitors 83 and 85 being interconnected and also connected to an output terminal 86. Another output terminal 87 is connected by conductor 75 to common point 77. A capacitor 90 is connected between conductor 75 to the junction of switches 81 and 84, and another capacitor 91 is connected between conductor 75 to the junction of switches 80 and 82.

It is seen that the essential difference between the circuits of FIGURE 3 and FIGURE 1 is the inclusion of capacitors 83 and 85 in FIGURE 3. These capacitors cooperate with the remainder of the circuit to cause a high-pass filter action.

*Operation of FIGURE 3*

The operation, in FIGURE 3, of the input network including resistors 70, 72 and 73 and capacitor 74 and of switches 80, 81, 82, and 84 may be the same as the analogous components in FIGURE 1. In this case the circuit of FIGURE 3 will not only operate as a high-pass filter, but will also contain the quadrature rejection characteristics of the circuit in FIGURE 1. If desired, however, the synchronization of switches 80, 81, 82, and 84 may be shifted so that the output signal includes a contribution from the quadrature components of the input signal. In either case the high-pass characteristics of this circuit are retained.

The term "high-pass," when used with respect to this circuit, refers to its high-pass filter characteristics with respect to the modulation frequency of the alternating current signal input applied to terminals 71 and 76. In other words, it refers to the frequency of the modulation envelope and not to the basic, or carrier, frequency.

The operation of this circuit as a high-pass filter will be understood upon consideration of the following examples. Suppose that the alternating current input signal applied to terminals 71 and 76 is of constant magnitude, that is, not amplitude modulated. Capacitor 90 will then be charged to the same value each cycle, and the closing of switch 84 will present the same potential to capacitor 85 each time. Once capacitor 85 is charged to a maximum point from capacitor 90 through switch 84 and through whatever impedance is connected across output terminals 86 and 87, no further change occurs in the voltage across capacitor 85 with further closings of switch 84. Since it is the change in charge of, or current flowing to, capacitor 85 that produces a voltage across a load connected to output terminals 86 and 87 upon the closings of switch 84, it is evident that an input signal modulated by a zero frequency produces substantially no output from capacitor 85. Capacitor 83 operates in the same fashion on the alternate half-cycles, so that no output results. On the other hand, when the magnitude of the alternating input signal changes, capacitor 90 is charged to a new potential level, as is capacitor 91. As a result, capacitors 85 and 83 also charge to a new potential level, and in so doing cause a potential difference to appear across any load connected across output terminals 86 and 87 during the change in input signal magnitude. Furthermore, for a given load, the faster the change in input signal magnitude. the greater is the output signal during that change. Consequently, the higher the modulating frequency, the larger is the output signal, which also follows the modulation signal in frequency. It is to be understood, of course, that the frequency with which the carrier input signal is modulated is substantially lower than the frequency of the carrier signal itself.

The circuit of FIGURE 3, then, furnishes both a high-pass filtering and, if desired, a simultaneous quadrature rejection.

*FIGURE 4*

Figure 4:
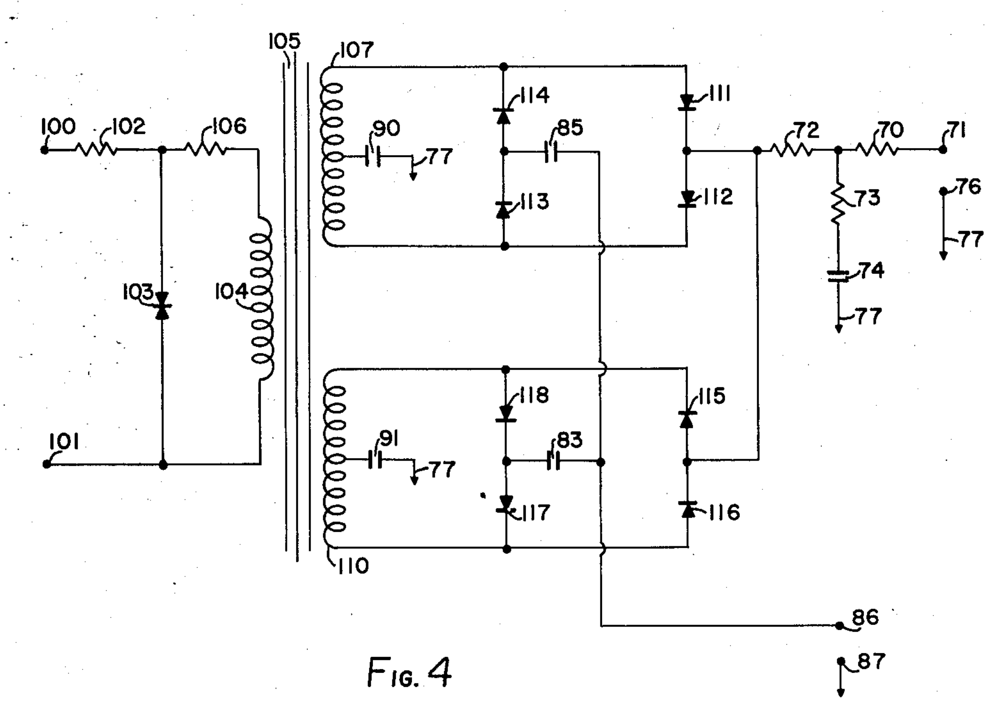
FIGURE 4 is a more detailed circuit of the apparatus of FIGURE 3.

The circuit of FIGURE 4 is similar to that of FIGURE 3, but shows the diode switch circuit in detail. The same components in each figure are designated by the same numerals. In addition to those components shown in FIGURE 3, FIGURE 4 has reference signal input terminals 100 and 101, across which are attached the series combination of a resistor 102 and a diode device 103. The primary winding 104 of a transformer 105 is connected in series with a resistor 106, this series combination being connected across Zener diode device 103. Transformer 105 has two substantially identical center tapped secondary windings 107 and 110. Capacitor 90 is connected from the center tap of winding 107 to common point 77, and capacitor 91 is connected from the center tap of winding 110 to common point 77. A ring of diodes 111, 112, 113, and 114 is connected in that order for easy current flow in one direction through the ring. The junction of diodes 111 and 114 is connected to one end of winding 107, and the junction of diodes 112 and 113 is connected to the other end of winding 107. The junction of diodes 113 and 114 is connected through capacitor 85 to output terminal 86, and the junction of diodes 111 and 112 is connected to signal input terminal 71 through the series combination of resistors 72 and 70. A further ring of diodes 115, 116, 117, and 118 is connected in that order for easy current flow in one direction around the ring. The junctions of diodes 115 and 118 and of diodes 116 and 117 are connected to opposite ends of winding 110. The junction of diodes 117 and 118 is connected through capacitor 83 to output terminal 86, and the junction of diodes 115 and 116 is connected to the junction of diodes 111 and 112. Windings 107 and 110 are so relatively poled that diodes 111 and 112 will be in an on condition when diodes 115 and 116 are off.

In FIGURE 4 the switches comprising diodes 111 and 112, 113 and 114, 115 and 116, and 117 and 118 correspond, respectively, with switches 81, 84, 80, and 82 of FIGURE 3. The operation of these diode switches is the same as explained previously with reference to the diode switches of FIGURE 2. The remainder of the circuit of FIGURE 4 has previously been explained with reference to FIGURE 3.

The components of the circuit of FIGURE 4 may be the same as those given for FIGURE 2, with the addition of capacitors 83 and 85, whose values are chosen to give the desired high-pass characteristics with whatever load is used. Those skilled in the art will be able to determine the values required according to the needs of particular applications.

Figure 5:
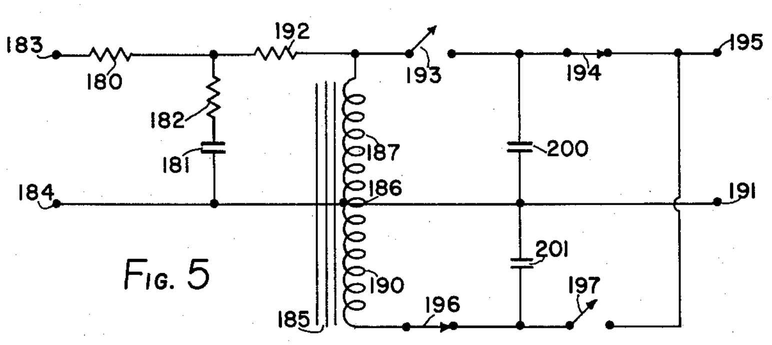
FIGURE 5 is a circuit of a demodulator that operates to reject quadrature.

*Structure of FIGURE 5*

FIGURE 5 is the circuit of a demodulator, the circuit and operation of which are similar in many respects to the previously explained quadrature rejector and high-pass filter. In the circuit shown in FIGURE 5 a resistor 180 is connected in series with a capacitor 181 and a further resistor 182, this series combination being connected across input terminals 183 and 184, with resistor 180 connected to terminal 183. An output transformer 185 is shown to have a center tapped winding. The center tap 186 divides this winding into an upper winding 187 and a lower winding 190. Center tap 186 is connected to input terminal 184 and is also connected to an output terminal 191. The outer end of winding 187 is connected through a resistor 192 to the junction of resistor 180 and resistor 182 and is also connected to one side of a switch 193, which is connected through a further switch 194 to another output terminal 195. The outer end of winding 190 is connected to one side of a switch 196, which is connected through another switch 197 to output terminal 195. A capacitor 200 is connected between center tap 186 and the junction of switches 193 and 194. A further capacitor 201 is connected between center tap 186 and the junction of switches 196 and 197.

*Operation of FIGURE 5*

As will be noted upon inspection, the circuit of FIGURE 5 is very similar to the circuit of FIGURE 1. The operation is also quite similar. Resistors 180, 182, and 192 along with capacitor 181 in FIGURE 5 serve the same purpose as the analogous resistors 21, 23, and 20 along with capacitor 22 of FIGURE 1. This purpose, it will be recalled, is to cause a phase lag in the input signal so that the voltage across whichever of the storage capacitors is connected to the input circuit is ninety degrees lagging with the input signal. In FIGURE 5 these storage capacitors are capacitors 200 and 201. The switches 193, 194, 196, and 197 also operate in the same manner as switches 15, 16, 17 and 18 respectively, of FIGURE 1. Thus, relative to the in-phase component of the input signal applied to terminals 183 and 184, switches 194 and 196 are closed between zero and $\pi$ radians, and switches 193 and 197 are closed between $\pi$ and $2\pi$ radians.

FIGURE 5, however, contains one component not shown in FIGURE 1, autotransformer 185. The purpose of transformer 185 will be understood from the following example. Suppose that the circuit is in normal operation with an alternating signal applied to input terminals 183 and 184. When switch 193 is closed capacitor 200 is charged to a certain value, for example, a certain positive voltage. During the next half cycle, then, switch 194 is closed, connecting capacitor 200 across output terminals 191 and 195 so that the positive voltage is presented at the output of the circuit. At the same time, switch 196 is closed and capacitor 201 is charged to a certain voltage. Since the polarity of the voltage from center tap 186 to the outer end of winding 190 is always the opposite of that from center tap 186 to the outer end of winding 187, the voltage at capacitor 201 during the present half-cycle is the same as that presented to capacitor 200 during the previous half cycle, and capacitor 201 is therefore charged to the same polarity as capacitor 200. When switch 96 opens, therefore, and switch 197 closes, capacitor 201 presents a voltage across terminals 191 and 195 of the same polarity as that presented previously by capacitor 200. It is seen, then, that the circuit of FIGURE 5 presents across output terminals 191 and 195 a direct current signal. The polarity of this direct current signal depends upon the phase of the input signal applied to terminals 183 and 184. A shift of 180° in the input signal charges capacitors 200 and 201 to a polarity just opposite that in the previous case, so that the output signal will also be of the opposite polarity. The circuit of FIGURE 5 has the same quadrature rejection features as explained previously with respect to FIGURE 1, so that the output magnitude presented across output terminals 191 and 195 depends upon the cosine of the angle between the input signal and the reference. The switches 193, 194, 196, and 197 may, of course, be replaced with diode switches of the sort explained with reference to FIGURE 2 or with other types of switches that may be convenient to use.

Figure 6:
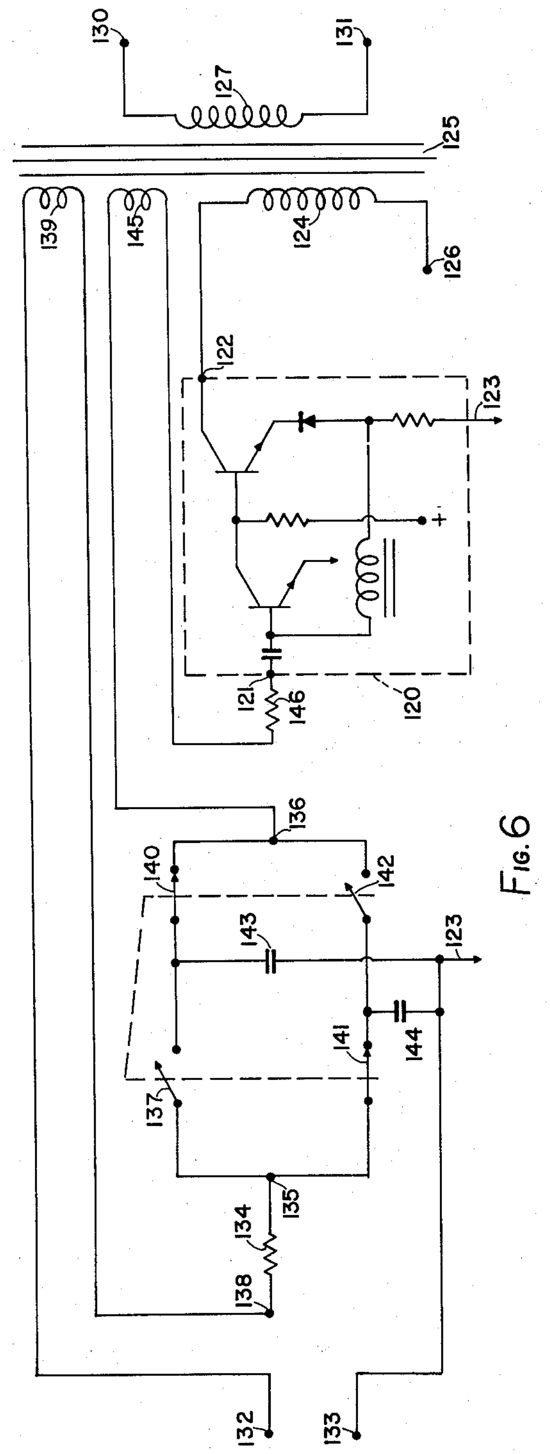
FIGURE 6 is a circuit of an alternating signal integrator embodying the invention.

*Structure of FIGURE 6*

FIGURE 6 is an alternating signal integrator circuit, which uses the storage elements, capacitors, in conjunction with a synchronized switching arrangement similar to that explained previously with respect to the quadrature rejector and the high-pass filter. In the integrator circuit of FIGURE 6, an alternating current amplifier 120, which is shown as a transistor amplifier, has a signal terminal 121, an output signal terminal 122, and a common connection 123. Output terminal 122 is connected to one end of a winding 124 of a transformer 125. The other end of winding 124 is a power terminal 126, to which is applied a voltage suitable for operation of the last stage of amplifier 120. Transformer 125 also has an output winding 127, which is connected across output terminals 130 and 131. The integrator circuit has input terminals 132 and 133, the latter of which is connected to common point 123. Input terminal 132 is connected to one end of a positive connected feedback winding 139 of transformer 125. The other end of positive feedback winding 139 is connected to point 138, which is connected through a resistor 134 to a node 135. Between node 135 and another node 136 are connected two pairs of series connected switches, switches 137 and 140 and switches 141 and 142. Switch 137 is connected from node 135 to switch 140, the other side of which is connected to node 136; switch 141 is connected from node 135 to switch 142, the other side of which is connected to node 136. The junction of switches 137 and 140 is connected by a capacitor 143 to common point 123, and the junction of switches 141 and 142 is connected by a capacitor 144 to common point 123. Node 136 is further connected through a negative feedback winding 145 of transformer 125 to one end of a resistor 146, the other end of which is connected to amplifier input terminal 121.

*Operation of FIGURE 6*

Figure 9:
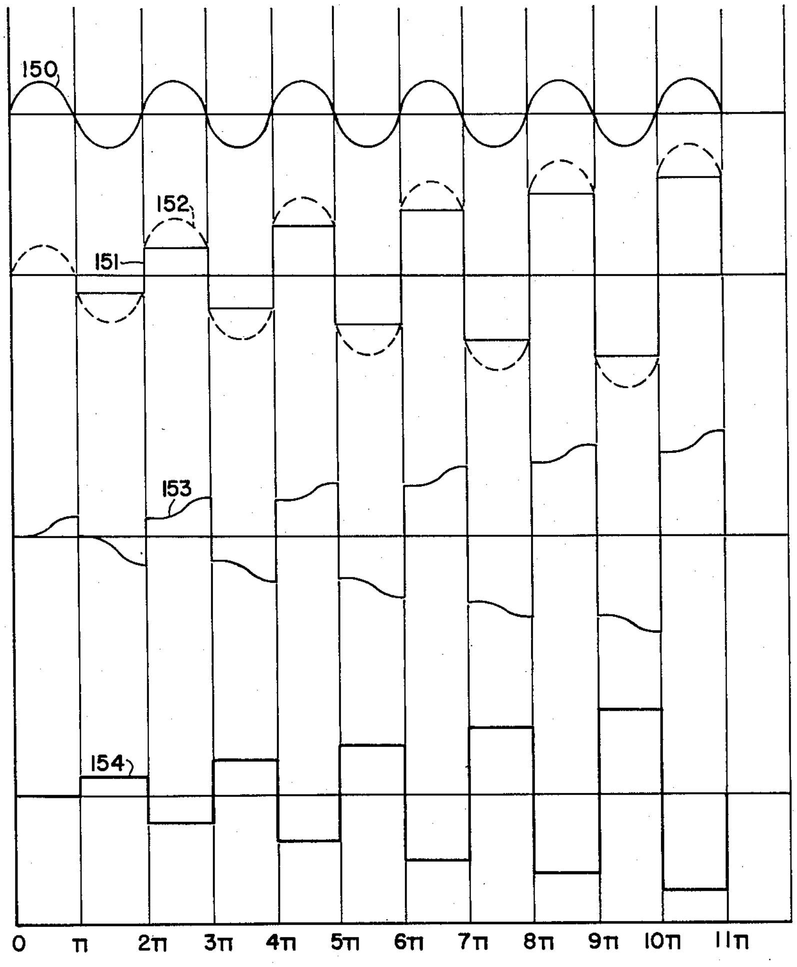
FIGURE 9 is a pictorial representation of wave forms appearing in the integrator circuit.

The operation of FIGURE 6 as an integrator having an alternating current input and an alternating current output will be explained with the aid of the curves in FIGURE 9. The switches 137, 140, 141, and 142 are operated in synchronism with the alternating current signal input. Switches 140 and 141 are closed and switches 137 and 142 are open during a first and each alternate half cycle of input signal. During the intervening half cycles of input signal the opposite condition prevails, that is, switches 137 and 142 are closed and switches 140 and 141 are open. The effect of this is to connect capacitor 143 to node 136 and capacitor 144 to node 135, during, for example positive half cycles of input signal, and to connect capacitor 143 to node 135 and capacitor 144 to node 136, then, during negative half cycles of signal input. To follow the integrating action of the circuit of FIGURE 6 in a step-by-step manner, let an alternating current input signal be applied across terminals 132 and 133. This signal is depicted by curve 150 of FIGURE 9. The input signal applied to 132 is fed through feedback winding 139 to point 138, so that the voltage appearing at point 138 is the combination of whatever feedback voltage appears across winding 139 superimposed upon the input signal at terminal 132. In FIGURE 9, the solid line curve 151 represents the positive feedback voltage, and the dotted curve 152 represents the input signal superimposed on this positive feedback signal. Curve 152 therefore represents the voltage at point 138. The voltage at node 135, which is the voltage across whichever capacitor happens to be connected to node 135 at the moment in question, is shown as curve 153. Curve 154 represents both the output across terminals 130 and 131 of the integrator and the voltage at node 136, for, while these two voltages may differ in magnitude, they have essentially the same wave form. It will be noted that the voltage of node 136 is the voltage of whichever of capacitors 143 and 144 is connected to it at the moment in question.

Starting with the first half cycle of input signal, and with the switches in the condition shown in FIGURE 6, it is seen that there is no positive feedback across winding 139. Consequently the voltage at point 138 during this first half cycle is simply the input signal voltage. Capacitor 144, being connected to node 135 during this first half cycle, will be charged to some positive potential, as shown by curve 153, until $\pi$ radians, at which point switch 141 opens. Also at $\pi$ radians, switch 142 is closed, so that the voltage of capacitor 144 is applied through negative feedback winding 145 and resistor 146 to input terminal 121 of amplifier 120. A positive signal output appears across output terminals 130 and 131 during the next half cycle, from $\pi$ to $2\pi$ radians, as shown by curve 154. During this same time, between $\pi$ and $2\pi$, a voltage proportional to the amplifier output also appears across positive feedback winding 139. This being true, capacitor 143, connected to node 135 upon the closing of switch 137 at $\pi$ radians, is charged between $\pi$ and $2\pi$ radians to a value dependent upon the value of input signal and the value of positive feedback signal during that period. At $2\pi$ radians the switches reverse conditions and connect capacitor 143 to amplifier 120, causing a negative output of greater magnitude than the previous positive output, and capacitor 144 is again connected to point 135, where it is charged to a higher positive potential. This process continues, so that the alternating output signal across terminals 130 and 131 has a magnitude proportional to the integral of the input signal magnitude. The negative feedback introduced by negative feedback winding 145 functions to establish gain stability of amplifier 120, and to increase the impedance between node 136 and common point 123. It will be understood that for proper operation of the integrator in FIGURE 6, the circuit must be arranged with the correct relation between circuit components. With this in mind, the values of circuit components used in a successful embodiment are given after a following discussion of FIGURE 7.

*FIGURE 7*

Figure 7:
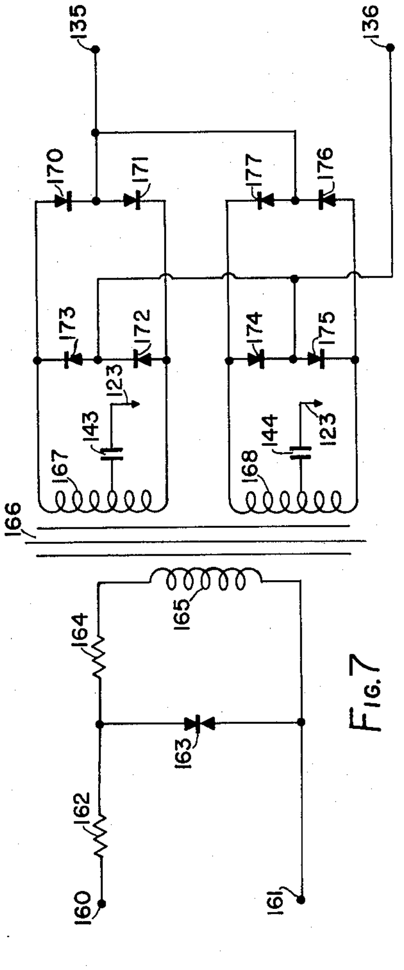
FIGURE 7 is a circuit showing a portion of FIGURE 5 in greater detail.

The circuit in FIGURE 7 is that of a diode switch arrangement used as the switches of FIGURE 6 and similar to those previously explained. Those parts of FIGURE 7 that are also shown in FIGURE 6 are designated by the same numerals.

The circuit has two terminals 160 and 161, to which is applied the alternating reference signal used to operate the diode switches in synchronized relation to the input signal of the integrator shown in FIGURE 6. A resistor 162 and a diode device 163 are connected in series across terminals 160 and 161. Another resistor 164 and a primary winding 165 of a transformer 166 are connected in series across Zener device 163. Transformer 166 has two substantially identical center tapped secondary windings 167 and 168. Capacitor 143 is connected between the center of winding 167 and common point 123, and capacitor 144 is connected between the center tap of transformer winding 168 and common point 123. Four diodes 170, 171, 172, and 173 are connected in a ring in that order, the connections being such that one direction around the ring is the direction of easy current flow for all the diodes. The junction of diodes 170 and 173 is connected to one end of winding 167, while the junction of diodes 171 and 172 is connected to the other end of winding 167. Another set of four diodes 174, 175, 176, and 177 is connected in a ring in the same fashion as just described. The junction of diodes 174 and 177 is connected to one end of winding 168, and the junction of diodes 175 and 176 is connected to the other end of winding 168. The junction of diodes 174 and 175 is connected to the junction of diodes 172 and 173 and also to node 136. The junction of diodes 176 and 177 is connected to the junction of diodes 170 and 171 and to node 135. Transformer windings 167 and 168 are poled in such a sense that diodes 170 and 171 and diodes 174 and 175 are forward biased at the same time, while during the same time, the other diodes 172, 173, 176, and 177 are back biased, and vice versa.

The circuitry of FIGURE 7 replaces switches 137, 140, 141 and 142 and capacitors 143 and 144 in FIGURE 6. The complete circuit of the integrator, including the diode switch detail, may be had by removing the above mentioned components in FIGURE 6 and connecting in place the circuit of FIGURE 7 as indicated by the numeral notation of node 135, node 136, and common point 123.

In one successful embodiment of the above integrator the following components were used:

| | |
|---|---|
| Transformer **125**: | |
| Winding **124** | 3500 turns. |
| Winding **127** | 3500 turns. |
| Winding **133** | 700 turns. |
| Winding **145** | 700 turns. |
| Resistor **134** | 47K ohms. |
| Resistor **146** | 10K ohms. |
| Capacitors **143** and **144** | 120 mfd. |
| Amplifier **120** | High-gain wide band amplifier. |

The diode switching components are the same values as those given previously with respect to FIGURE 2.

Changes and modifications of this invention will undoubtedly occur to those who are skilled in the art, and I therefore wish to be understood that I intend to be limited by the scope of the appended claims and not by the specific details of my invention disclosed herein for the purpose of illustration only.

I claim:

1. Electric apparatus comprising: first and second energy storage means; an input circuit having first and second terminals; an output circuit having first and second terminals; means connecting the second terminal of said input circuit to the second terminal of said output circuit; third and fourth energy storage means; means connecting said third and fourth energy storage means to the first terminal of said output circuit; a source of reference signals; and switching means connected to said reference signals and operable in response thereto for connecting said first energy storage means alternately across said input circuit and to said third energy storage means and simultaneously and respectively connecting said second energy storage means alternately to said fourth energy storage means and across said input.

2. An alternating signal integrator comprising: first and second energy storage means; an input circuit; feedback means; a source of reference signals; switching means responsive to said reference signals for connecting said first and second energy storage means in a mutually exclusive manner alternately in circuit with said input circuit and said feedback means; an amplifier connected to receive signals from said feedback means, said amplifier including output means; and means connecting said output means to said input circuit so as to apply positive feedback signals to said input circuit.

3. Electric apparatus comprising: first, second, third, and fourth electric switching means, each of said switching means comprising a single pair of serially connected diodes, the conductive state of the diodes adapted to be controlled by a reference signal; first and second capacitive means; an input circuit; an output circuit; conductive means connected to, and furnishing a common point between, said input and output circuits; means connecting said first and second switching means in series relationship between said input and output circuits; means connecting said third and fourth switching means in series relationship between said input and output circuits; means connecting said first capacitive means between a point intermediate said first and second switching means and said common point; means connecting said second capacitive means between a point intermediate said third and fourth switching means and said common point; and reference signal means simultaneously operating said first and fourth switching means to a closed condition and said second and third switching means to an open condition and cyclically reversing said condition.

4. Electric apparatus comprising: first and second energy storage means; an input circuit; an output circuit; transformer means having a primary winding and first and second secondary windings; means adapted to connect said primary winding to a source of reference signals; and first, second, third and fourth diode switching means, said first and second switching means being connected across said first secondary winding and said third and fourth switching means being connected across said second secondary winding, said switch means being operable in response to said reference signals to alternate between a first condition, wherein said first energy storage means is connected across said input circuit and said second energy storage means is connected across said output circuit, and a second condition, wherein said second energy storage means is connected across said input circuit and said first energy storage means is connected across said output circuit.

5. Electric apparatus comprising: an input circuit; an output circuit; first and second energy storage means; a source of reference signals; switching means comprising in combination, transformer means having a primary winding and first and second secondary windings, first and second pairs of serially connected diodes oppositely connected across said first secondary winding, and third and fourth pairs of serially connected diodes oppositely connected across said second secondary winding; and means connecting said transformer primary winding to said source of reference signals whereby said switching means alternates between a first condition wherein said first energy storage means is connected across the input circuit and said second energy storage means is connected across the output circuit, and a second condition wherein said second energy storage means is connected across said input circuit and said first energy storage means is connected across said output circuit.

References Cited in the file of this patent

UNITED STATES PATENTS

| | | |
|---|---|---|
| 1,796,254 | Nyman | Mar. 10, 1931 |
| 2,047,463 | Dubilier | July 14, 1936 |
| 2,235,385 | Rava | Mar. 18, 1941 |